United States Patent
Weaver et al.

(10) Patent No.: US 7,271,133 B2
(45) Date of Patent: Sep. 18, 2007

(54) METHODS AND COMPOSITIONS FOR TREATING SUBTERRANEAN FORMATIONS

(75) Inventors: Jimmie D. Weaver, Duncan, OK (US); Billy F. Slabaugn, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 297 days.

(21) Appl. No.: 10/670,412

(22) Filed: Sep. 24, 2003

(65) Prior Publication Data

US 2005/0065038 A1   Mar. 24, 2005

(51) Int. Cl.
*C09K 8/68* (2006.01)

(52) U.S. Cl. .................. 507/209; 507/211; 507/214; 507/215; 507/216; 507/217; 507/225; 507/224; 507/230; 166/308.5

(58) Field of Classification Search ................... None
See application file for complete search history.

(56) References Cited

U.S. PATENT DOCUMENTS

| | | | |
|---|---|---|---|
| 5,062,969 A | 11/1991 | Holtmyer et al. | 252/8.551 |
| 5,179,083 A | 1/1993 | Zody et al. | 514/54 |
| 5,566,760 A | 10/1996 | Harris | 166/308 |
| 5,855,878 A * | 1/1999 | Coffindaffer et al. | 424/70.11 |
| 5,990,052 A * | 11/1999 | Harris | 507/214 |
| 6,194,356 B1 * | 2/2001 | Jones et al. | 507/225 |
| 6,605,570 B2 * | 8/2003 | Miller et al. | 507/211 |
| 6,803,348 B2 * | 10/2004 | Jones et al. | 507/221 |
| 6,908,888 B2 * | 6/2005 | Lee et al. | 507/219 |
| 2001/0020531 A1 * | 9/2001 | Varadaraj et al. | 166/270.1 |
| 2002/0004464 A1 * | 1/2002 | Nelson et al. | 507/200 |
| 2003/0180466 A1 * | 9/2003 | Rohrbaugh et al. | 427/372.2 |
| 2004/0209780 A1 * | 10/2004 | Harris et al. | 507/117 |
| 2004/0229756 A1 * | 11/2004 | Eoff et al. | 507/219 |
| 2004/0259739 A1 * | 12/2004 | Monfreux-Gaillard et al. | 507/117 |
| 2005/0000694 A1 * | 1/2005 | Dalrymple et al. | 166/307 |
| 2006/0205605 A1 * | 9/2006 | Dessinges et al. | 507/211 |

FOREIGN PATENT DOCUMENTS

WO   WO 99/50530   * 10/1999

OTHER PUBLICATIONS

Rosen et al., LANGMUIR (1998), vol. 14, No. 20, pp. 5795-5801.*
Sjostrom et al., LANGMUIR (2001), vol. 17, No. 13, pp. 3836-3843.*
"Notes—Influence of a Nonionic Surfactant on the Dilute Hydrodynamical Properties of a Hydrophobically Associating Water Soluble Polymer" by Thierry Aubry and Michel Moan in the Macromolecules 1998, 31, 9072-9074, Nov. 11, 1998.

* cited by examiner

*Primary Examiner*—Philip C. Tucker
(74) *Attorney, Agent, or Firm*—Robert A. Kent; Baker Botts

(57) ABSTRACT

Methods for treating subterranean formations and aqueous treating fluid compositions are provided. The aqueous treating fluid compositions comprise water, a water soluble hydrophobically modified gelling agent polymer produced by grafting a low concentration of hydrophobic monomers thereon, and a low concentration of an ionic surfactant the hydrophobic chain portion of which is associated with the hydrophobic monomers grafted onto the gelling agent polymer resulting in gelling agent polymer molecules having increased radiuses of gyration.

41 Claims, 3 Drawing Sheets

METHODS AND COMPOSITIONS FOR TREATING SUBTERRANEAN FORMATIONS

BACKGROUND OF THE INVENTION

1. Field of the Invention

The present invention relates to methods and aqueous treating fluid compositions for treating subterranean formations.

2. Description of the Prior Art

Viscous treating fluids are used in a variety of operations and treatments in oil and gas wells. Such operations and treatments include forming gravel packs in well bores, fracturing producing zones, performing permeability control treatments and the like.

Hydrocarbon producing wells are often stimulated by hydraulic fracturing treatments. In hydraulic fracturing, a viscous fracturing fluid, which also functions as a carrier fluid, is pumped into a subterranean zone to be fractured at a rate and pressure such that one or more fractures are formed in the zone. Proppant particles, e.g., graded sand, for propping the fractures open are suspended in the fracturing fluid and are deposited in the fractures when the fluid's viscosity is reduced below a given point. A viscosity breaker is included in the fracturing fluid whereby the fracturing fluid reverts to a thin fluid that is returned to the surface. The proppant particles deposited in the fractures function to prevent the fractures from closing so that conductive channels are formed through which produced hydrocarbons can readily flow.

Aqueous fracturing fluids are generally viscosified by mixing a hydratable polysaccharide gelling agent with water. For example, guar gum and its derivatives are often used to viscosify aqueous fracturing fluids. Guar gum is a random coil polymer that can be readily crosslinked with various cross-linking agents, e.g., metal ions. Once crosslinked, guar and guar derivatives can form highly viscoelastic gels that approach near zero suspended particle settling rates.

It is desirable to maximize the efficiency of gelling agents in hydraulic fracturing fluids, and this is especially true for guar and guar derivatives. The utility of viscous gels is well known in the petroleum industry. However, it has been demonstrated that gel residue left in fractured formations and in proppant particle packs therein after a fracturing treatment results in reduction in the conductivity of the formation. To minimize the damage caused by the gel residue, efforts have been made to minimize the amount of gelling agent included in fracturing fluids.

To increase the effectiveness of gelling agents in general, ionic groups, for example carboxyl groups, have heretofore been grafted onto gelling agents. Since like charges tend to repel each other, the ionic groups force the flexible coiled polymer to become more linear. Increasing the linearity of a gelling agent results in an enlarged radius of gyration, which in turn results in less gelling agent being required to generate a stable gelled fluid having the desired viscosity. The minimum concentration required to form a stable gelled fluid is sometimes referred to as the critical overlap concentration.

While grafting an ionic group onto a gelling agent increases its radius of gyration, it also renders the gelling agent sensitive to the presence of multivalent metal ions. This sensitivity, in turn, causes the viscosity of the gelling agent in a salt solution to be less than the viscosity in fresh water. Since, aqueous fracturing and other well treating fluids often include chloride salts to inhibit swelling of formation clays or are formed with brine and seawater, the salt sensitivity is undesirable.

More recently, foamed aqueous fracturing fluids containing hydrophobically modified gelling agents, preferably hydrophobically modified guar, have been developed. The viscosifying effect of the hydrophobically modified gelling agent is increased by adding a surfactant such as alpha olefin sulfonate. The surfactant is included in the foamed fluid in an amount in the range of about 0.2% to about 0.75% by weight of the aqueous solution, and the surfactant functions to crosslink the gelling agent molecules and to produce a foamed fracturing gel. An additional conventional crosslinker can be added to the foamed fracturing fluid to increase its viscosity further. The advantage over conventionally crosslinked foamed fracturing gels is that the foam more readily washes away after fracturing. However, the foamed fracturing fluid does not significantly reduce the level of gelling agent utilized therein.

Thus, there are continuing needs for improved methods of treating subterranean zones with viscous aqueous treating fluids whereby the formation of residue is minimized leaving the subterranean formation more conductive to fluid flow.

SUMMARY OF THE INVENTION

By the present invention, improved methods of using viscous aqueous treating fluids in subterranean formation treatments and improved viscous aqueous treating fluid compositions are provided which meet the above described needs and overcome the deficiencies of the prior art. The methods of treating subterranean formations basically comprise the following steps. An aqueous treating fluid composition is prepared or provided comprising water, a water soluble hydrophobically modified gelling agent polymer produced by grafting a low concentration of hydrophobic monomers onto the polymer, and a low concentration of an ionic surfactant the hydrophobic chain of which associates with the hydrophobic monomers grafted onto the polymer. The association results in an increased gelling agent polymer molecule radius of gyration which allows less gelling agent polymer to be used and less gelling agent residue to be left in the subterranean formation. The aqueous treating fluid is then pumped into the subterranean formation.

The viscous aqueous treating fluid compositions of this invention comprise water, a water soluble hydrophobically modified gelling agent polymer produced by grafting a low concentration of hydrophobic monomers onto the polymer, and a low concentration of an ionic surfactant the hydrophobic chain of which associates with the hydrophobic monomers grafted onto the polymer.

The objects, features and advantages of the present invention will be readily apparent to those skilled in the art upon a reading of the description of preferred embodiments which follows.

DESCRIPTION OF PREFERRED EMBODIMENTS

The methods of this invention for treating subterranean formations penetrated by well bores basically comprise the following steps. An aqueous treating fluid composition is prepared or provided comprising water, a water soluble hydrophobically modified gelling agent polymer produced by grafting a low concentration of hydrophobic monomers onto the polymer, and a low concentration of an ionic surfactant the hydrophobic chain of which associates with the hydrophobic monomers grafted onto the polymer. The association results in an increased gelling agent polymer molecule radius of gyration. The aqueous treating fluid composition is then pumped into a subterranean formation.

The water utilized in the aqueous treating fluid compositions of this invention can be fresh water or salt water. The term "salt water" is used herein to mean unsaturated salt water including brines and seawater.

Figure 1:
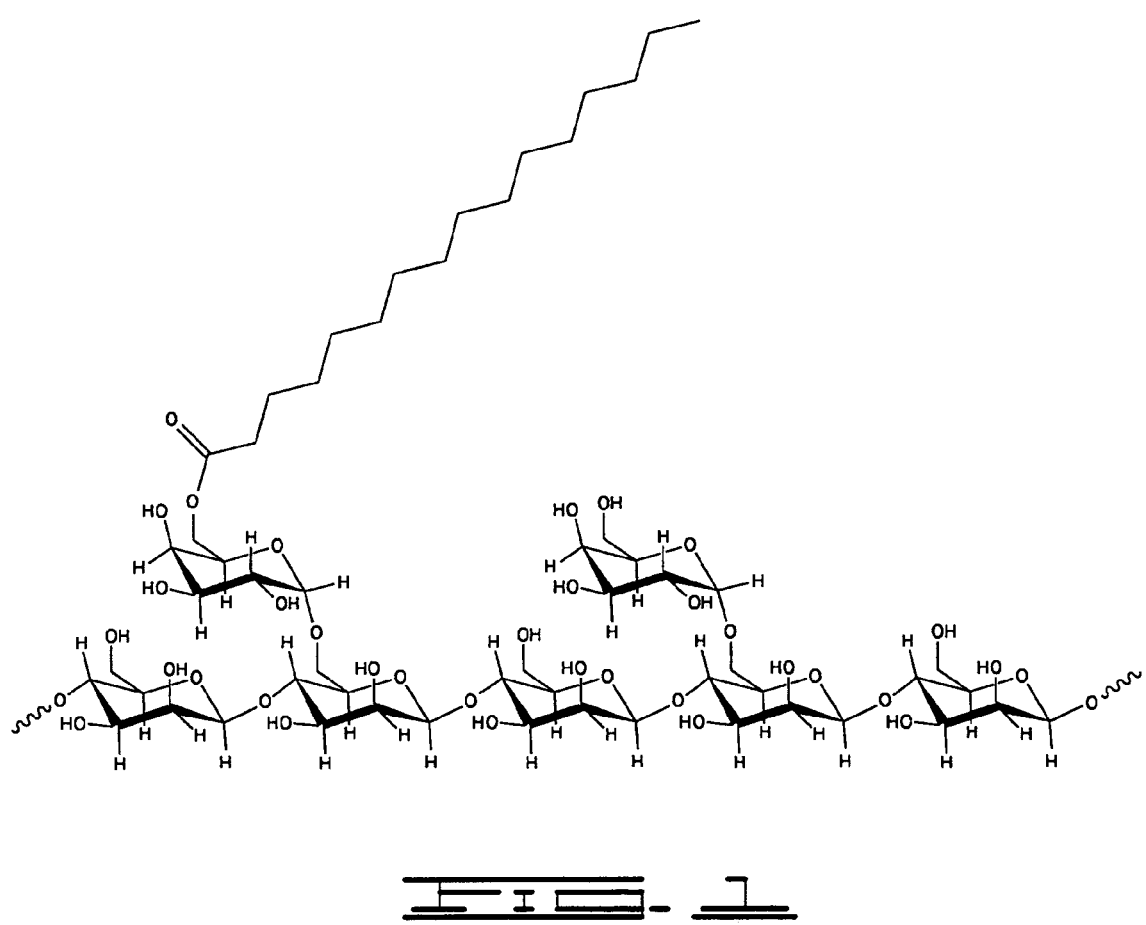
FIG. 1 shows an example of a hydrophobically modified guar polymer.
Figure 2:
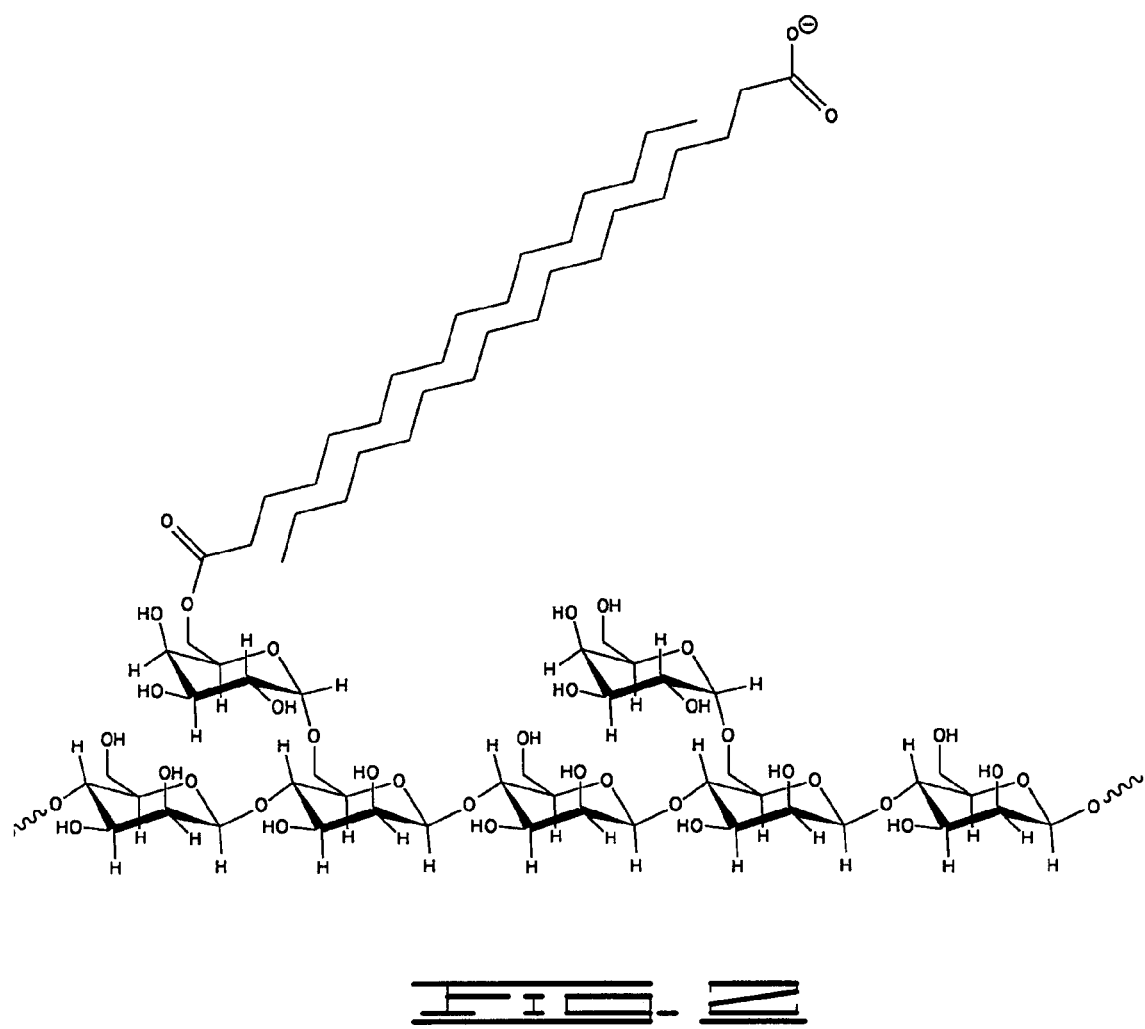
FIG. 2 shows how an anionic surfactant is likely to associate with the hydrophobic group grafted onto the guar polymer.
Figure 3:
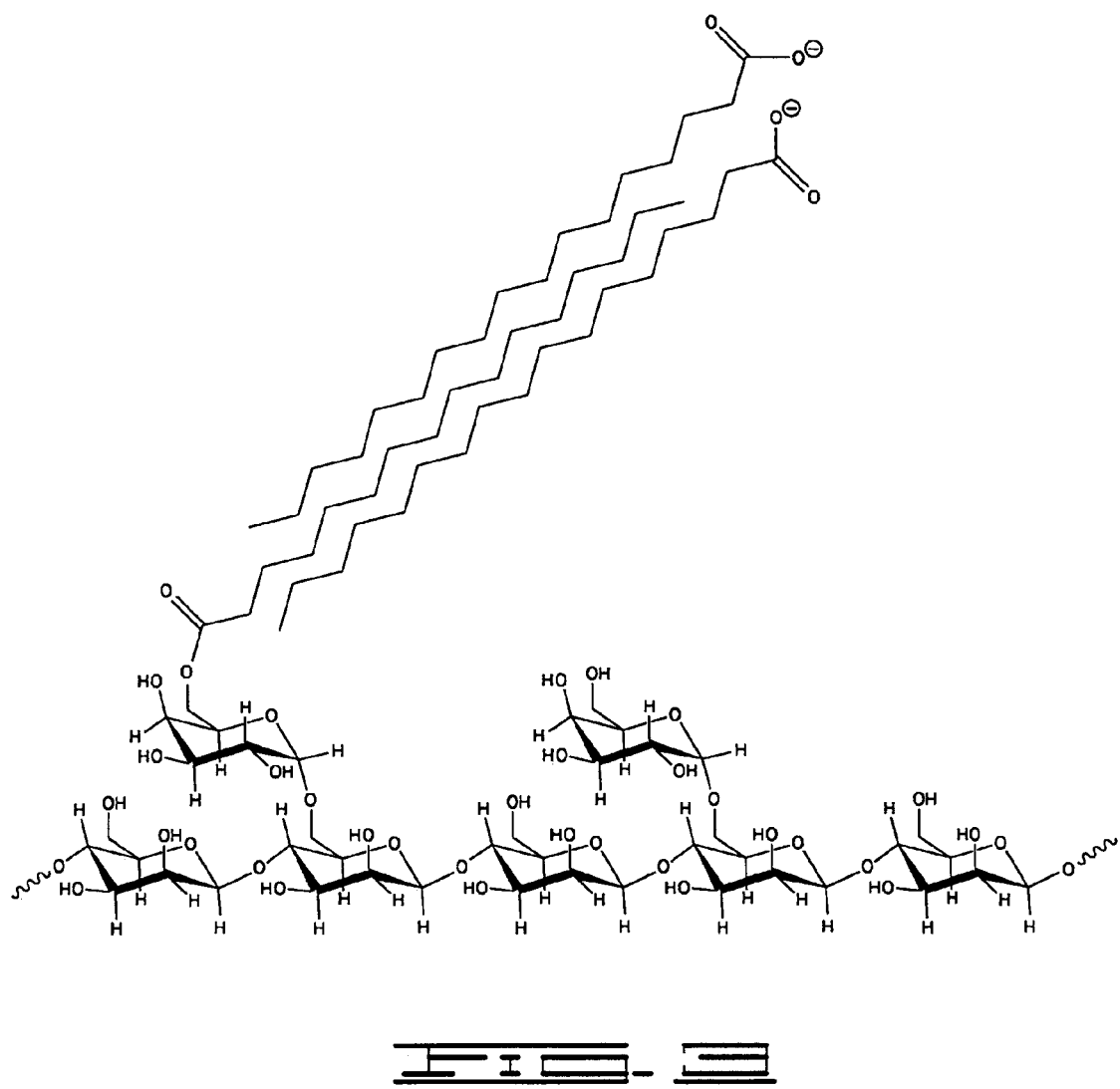
FIG. 3 shows how the number of surfactant molecules associated with the grafted hydrophobic group can be varied by concentration to overcome the effect of ionic fluids such as brines and seawater.

The hydrophobically modified polymer is produced by grafting hydrophobic monomers onto a polymer. FIG. 1 of the drawings shows an example of a hydrophobically modified guar polymer. Such a hydrophobically modified guar polymer is commercially available under the trade designation "RT-200™" from Rhodia, Inc. of Cranberry, N.J.

For the hydrophobically modified polymer to be soluble in water, the number of hydrophobes per soluble molecule must be limited, and their chain length should be no more than about $C_8$-$C_{28}$. The hydrophobic groups are grafted onto the polymer in two steps. The first step is to prepare alkyl ethers of the polymer. The first alkyl substituent is selected from the group consisting of R and $HOR^1$ wherein R is an alkyl group containing one to four carbon atoms, wherein $R^1$ is an alkylene group containing two to four carbon atoms and wherein the OH group is on the carbon atom beta to the ether group. Accordingly, the alkyl ethers of the polymer first formed are the methyl, ethyl, propyl, butyl hydroxyethyl, hydroxypropyl and hydroxy butyl ethers of the polymer. The procedures used are well known to those skilled in the art.

The second alkyl substituent is selected from the group consisting of $R^2$, $HOR^3$, and

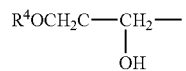

wherein $R^2$ is an alkyl group which contains about 8 to about 28 carbon atoms, wherein $R^3$ is an alkylene group which contains about 8 to about 28 carbon atoms having the OH group on the carbon atom beta to the ether group and wherein $R^4$ is an alkyl group containing about 5 to 25 carbon atoms.

The second step reacts the alkyl ether of the polymer with a long aliphatic chain epoxy compound which contains from about 8 to about 28 carbon atoms or an alkyl halide having about 8 to about 28 carbon atoms in the alkyl group. Examples of useful epoxy compounds are 1,2 epoxyoctane, 1,2-epoxydodecane, 1,2-epoxyhexadecane, epoxytetracosane and the like. Other suitable long chain epoxy compounds are glycyl ethers of amyl alcohol, hexano octanol, lauryl alcohol, stearyl alcohol, lignoceryl alcohol, and the like. Examples of useful alkyl halides are octyl chloride, decyl bromide, dodecyl iodine, hexadecyl bromide and the like. The conditions in which the long chain alkylation reaction is conducted are well known to those skilled in the art.

For purposes of this invention, the first alkyl substituent, R or $HOR^1$, is present in a molecular substitution of about 0.3 to about 1.5. The second alkyl substituent, $R^2$,

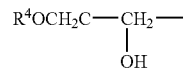

is present in a molecular substitution of about 0.001 to about 0.2 with the preferred molecular substitution being about 0.005 to about 0.10.

Various gelling agent polymers can be utilized to produce the hydrophobically modified gelling agent polymer including, but not limited to, biopolymers such as xanthan and succinoglycon, water dispersible organic polymers such as polyvinyl alcohols, polyacrylamides, polyacrylates and acrylamide/acrylic acid copolymers, and natural and derivatized polysaccharides including guar, guar derivatives and cellulose derivatives.

Examples of natural polysaccharides which are suitable for use in accordance with the present invention include galactomannan gums such as guar gum, gum arabic, gum ghatti, gum karaya, tamarind gum, locust bean gum and the like. Modified and derivatized gums such as carboxyalkyl derivatives, e.g., carboxymethylguar, and hydroxyalkyl derivatives, e.g., hydroxypropylguar, can also be employed. Doubly derivatized gums such as carboxymethylhydroxypropylguar can also be used.

Examples of cellulose derivatives include, but are not limited to, carboxymethylcellulose, carboxymethylhydroxyethylcellulose, hydroxyethylcellulose, methylhydroxypropylcellulose, methylcellulose, ethylcellulose, propylcellulose, ethylcarboxymethylcellulose, methylethylcellulose, hydroxypropylmethylcellulose and the like. Biopolymers which can be used include xanthan and succinoglycon.

The hydrophobically modified gelling agent polymer is preferably present in the aqueous treating fluid in a low concentration, i.e., in an amount in the range of from about 20 lbs to about 60 lbs of gelling agent polymer per 1000 gals of the aqueous treating fluid composition, and more preferably, from about 30 lbs to about 45 lbs per 1000 gals.

Various gelling agent polymers can be utilized to produce the hydrophobically modified gelling agent polymer including, but not limited to, biopolymers such as xanthan and succinoglycan, water dispersible organic polymers such as polyvinyl alcohols, polyacrylamides, polyacrylates and acrylamide/acrylic acid copolymers, and natural and derivatized polysaccharides including guar, guar derivatives and cellulose derivatives.

Cationic surfactant which can be used with anionic agent polymers include, but are not limited to, trimethylcocoammonium chlroide, trimethyltallowammonium chloride, dimethyldicocoammonium chloride, bis(2-hydroxyethyl)tallow amine, bis(2-hydroxyethyl)erucylamine, bis(2-hydroxyethyl)coco-amine, cetylpyridinium chloride, and mixtures therof. Of these, trimethylcocoammonium chloride is preferred.

Examples of cellulose derivatives include, but are not limited to, carboxymethylcellulose, carboxymethylhydroxyethylcellulose, hydroxyethylcellulose, methylhydroxypropylcellulose, methylcellulose, ethylcellulose, propylcellulose, ethylcarboxymethylcellulose, methylethylcellulose, hydroxypropylmethylcellulose and the like. Biopolymers which can be used include xanthan and succinoglycan.

When it is desired to increase the viscosity of the gelled aqueous treating fluid, a cross-linking agent can be used. Examples of suitable crosslinking agents include, but are not limited to, boron compounds such as, for example, boric acid, disodium octaborate tetrahydrate, sodium diborate and pentaborates, ulexite and colemanite; compounds which can supply zirconium IV ions such as, for example, zirconium lactate, zirconium lactate triethanolamine, zirconium carbonate, zirconium acetylacetonate and zirconium diisopropylamine lactate; compounds that can supply titanium IV ions such as, for example, titanium ammonium lactate, titanium triethanolamine and titanium acetylacetonate; aluminum compounds such as aluminum lactate or aluminum citrate and compounds that can supply antimony ions. Of these, ulexite is preferred. The exact type and amount of crosslinking agent or agents used depends upon the specific gelling agent polymer to be crosslinked, formation temperature conditions and other factors known to those skilled in the art. When used, the crosslinking agent is included in the aqueous treating fluid composition in an amount in the range of from about 4 lbs to about 40 lbs per 1000 gallons of the aqueous treating fluid composition.

The methods and treating fluid compositions of this invention can be utilized in a variety of well treatments and operations known to those skilled in the art. Methods of fracturing subterranean formations and fracturing fluid compositions are particularly improved by the present invention due to the lower concentration of gelling agent polymer required and the reduction of gelling agent residue. A subterranean formation is fractured in accordance with the methods of this invention by preparing or providing a fracturing fluid composition of this invention as described above, and introducing the fracturing fluid composition into the subterranean formation at a rate and pressure sufficient to form one or more fractures therein.

A preferred method of this invention for treating a subterranean formation penetrated by a well bore comprises the steps of: (a) preparing or providing an aqueous treating fluid composition comprising water, a water soluble hydrophobically modified gelling agent polymer produced by grafting a low concentration of hydrophobic monomers onto the gelling agent polymer, and a low concentration of an ionic surfactant the hydrophobic chain portion of which is associated with the hydrophobic monomers grafted onto the gelling agent polymer resulting in gelling agent polymer molecules having increased radiuses of gyration and (b) pumping the aqueous treating fluid composition into the subterranean formation.

A preferred method of fracturing a subterranean formation penetrated by a well bore comprises the steps of:

(a) preparing or providing an aqueous fracturing fluid composition comprising water, a water soluble hydrophobically modified gelling agent polymer produced by grafting a low concentration of hydrophobic monomers onto the gelling agent polymer, and a low concentration of an ionic surfactant the hydrophobic chain portion of which is associated with the hydrophobic monomers grafted onto the gelling agent polymer resulting in gelling agent polymer molecules having increased radiuses of gyration; and (b) pumping the fracturing fluid composition into the subterranean formation at a rate and pressure sufficient to form one or more fractures therein.

A preferred aqueous treating fluid composition for treating a subterranean formation of this invention comprises: water; a water soluble hydrophobically modified gelling agent polymer produced by grafting a low concentration of hydrophobic monomers onto the gelling agent polymer; and a low concentration of an ionic surfactant the hydrophobic chain portion of which is associated with the hydrophobic monomers grafted onto the gelling agent polymer resulting in gelling agent polymer molecules having increased radiuses of gyration.

In order to further illustrate the methods and compositions of the present invention, the following example is given.

EXAMPLE

Rhodia, Inc. "RT-200™" hydrophobically modified guar was dissolved in dionized water at a strength of 2.5 g per 500 mL of water. The resulting 6.8 pH gel was stirred at slow to medium speed in a "WARING™" blender cup at room temperature. The viscosity was measured at various time intervals using a "FANN™" 35 Viscometer at 300 RPM with a ⅕ spring. The results are shown in Table 1 below.

TABLE 1

Viscosity of a Hydrophobically Modified Guar

| Time Elapsed Min. | Gel Temp. ° F. | Viscosity cP |
|---|---|---|
| 30 | 74.1 | 36.8 |
| 105 | 73.7 | 37.4 |
| 120 | 73.6 | 37.4 |

Sodium lauryl sulfate surfactant was then added to the hydrophobically modified guar solution in small amounts and the viscosity was measured after each addition. Table 2 shows the resulting increases in the viscosity of the solution. The addition of 0.05% sodium lauryl sulfate to the solution of hydrophobically modified guar caused the solution viscosity to increase by about 60% from 37 cP to 60 cP thereby demonstrating a significant increase in the hydrodynamic volume of the polymer.

TABLE 2

Effect of Sodium Lauryl Sulfate on Viscosity

| Sodium Lauryl Sulfate, % | Gel Temp. ° F. | Viscosity cP |
|---|---|---|
| 0.004 | 73.4 | 38.0 |
| 0.016 | 73.2 | 39.2 |
| 0.020 | 73.4 | 42.4 |
| 0.030 | 74.2 | 47.8 |
| 0.040 | 76.2 | 53.0 |
| 0.050 | 77.9 | 60.0 |

What is claimed is:

1. A method of treating a subterranean formation penetrated by a well bore comprising:

preparing or providing an aqueous treating fluid composition comprising water, a water soluble hydrophobically modified gelling agent polymer produced by grafting a low concentration of hydrophobic monomers onto a gelling agent polymer, a crosslinking agent, and an ionic surfactant having a hydrophobic chain portion associated with said hydrophobic monomers grafted onto said gelling agent polymer resulting in hydrophobically modified gelling agent polymer molecules having increased radiuses of gyration, wherein said ionic surfactant is present in said treating fluid composition in an amount in the range of from about 0.01% to about 0.025% by weight of said composition; and pumping said aqueous treating fluid composition into said subterranean formation.

2. The method of claim 1 wherein said water is selected from the group consisting of fresh water and salt water.

3. The method of claim 1 wherein said hydrophobic monomers grafted onto said hydrophobically modified gelling agent polymer comprise at least two different alkyl substituents wherein the first alkyl substituent is selected from the group consisting of R and $HOR^1$ wherein R is an alkyl group containing from 1 to about 4 carbon atoms and $R^1$ is an alkylene group containing from about 2 to about 4 carbon atoms and the OH group is on the carbon atom beta to the ether group, and the second alkyl substituent is selected from the group consisting of $R^2$, $HOR^3$, and

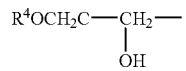

wherein $R^2$ is an alkyl group containing from about 8 to about 28 carbon atoms, $R^3$ is an alkylene group containing from about 8 to about 28 carbon atoms and the OH group is on the carbon atom beta to the ether group, and $R^4$ is an alkyl group containing from about 5 to about 25 carbon atoms, wherein the substituent R or $HOR^1$ is present in a molecular substitution of from about 0.3 to about 1.5 and wherein the substituent $R^2$, $HOR^3$, or

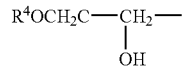

is present in a molecular substitution of from about 0.001 to about 0.2.

4. The method of claim 1 wherein said gelling agent polymer is a biopolymer selected from the group consisting of xanthan and succinoglycan.

5. The method of claim 1 wherein said gelling agent polymer is a water dispersible organic polymer selected from the group consisting of polyvinyl alcohol, polyacrylamide, polyacrylate, and polyacrilamide/acrylic acid copolymers.

6. The method of claim 1 wherein said gelling agent polymer is a polysaccharide selected from the group consisting of galactomannan gums, derivative galactomannan gums, and cellulose derivatives.

7. The method of claim 6 wherein said galactomannan gum is selected from the group consisting of guar gum, gum arabic, gum ghatti, gum karaya, tamarind gum, and locust bean gum.

8. The method of claim 6 wherein said derivatized galactomannan gum is selected from the group consisting of carboxyalkyl and hydroxyalkyl derivatives of guar.

9. The method of claim 6 wherein said cellulose derivative is selected from the group consisting of carboxymethylcellulose, carboxymethylhydroxyethylcellulose, hydroxyethylcellulose, methylhydroxypropylcellulose, methylcellulose, ethylcellulose, propylcellulose, ethylcarboxymethylcellulose, methylethylcellulose, and hydroxypropylmethylcellulose.

10. The method of claim 1 wherein said hydrophobically modified gelling agent polymer is present in said treating fluid composition in an amount in the range of from about 20 lbs to about 60 lbs per 1000 gal of said composition.

11. The method of claim 1 wherein said ionic surfactant is an anionic surfactant selected from the group consisting of sodium lauryl sulfate, alpha olefin sulfonate, alkylether sulfates, alkyl phosphonates, alkane sulfonates, fatty acid salts, arylsulfonic acid salts, and mixtures thereof.

12. The method of claim 1 wherein said ionic surfactant is a cationic surfactant selected from the group consisting of trimethylcocoammonium chloride, trimethyltallowammonium chloride, dimethyldicocoammonium chloride, bis(2-hydroxyethyl)tallow amine, bis(2-hydroxyethyl)erucylamine, bis(2-hydroxyethyl)coco-amine, cetylpyridinium chloride, and mixtures thereof.

13. The method of claim 1 wherein said crosslinking agent is selected from the group consisting of boron compounds, compounds that supply zirconium IV ions, compounds that supply titanium IV ions, aluminum compounds, and compounds that supply antimony ions.

14. The method of claim 1 wherein said crosslinking agent is present in said aqueous treating fluid composition in an amount in the range of from about 4 lbs to about 40 lbs per 1000 gallons of said aqueous treating fluid composition.

15. A method of fracturing a subterranean formation penetrated by a well bore comprising:

preparing or providing an aqueous fracturing fluid composition comprising water, a water soluble hydrophobically modified gelling agent polymer produced by grafting a low concentration of hydrophobic monomers onto a gelling agent polymer, a crosslinking agent, and an ionic surfactant having a hydrophobic chain portion associated with said hydrophobic monomers grafted onto said gelling agent polymer resulting in hydrophobically modified gelling agent polymer molecules having increased radiuses of gyration, wherein said ionic surfactant is present in said treating fluid composition in an amount in the range of from about 0.01% to about 0.025% by weight of said composition; and pumping said fracturing fluid composition into said subterranean formation at a rate and pressure sufficient to form one or more fractures therein.

16. The method of claim 15 wherein said water is selected from the group consisting of fresh water and salt water.

17. The method of claim 15 wherein said hydrophobic monomers grafted onto said hydrophobically modified gelling agent polymer comprise at least two different alkyl substituents wherein the first alkyl substituent is selected from the group consisting of R and $HOR^1$ wherein R is an alkyl group containing from 1 to about 4 carbon atoms and $R^1$ is an alkylene group containing from about 2 to about 4 carbon atoms and the OH group is on the carbon atom beta to the ether group, and the second alkyl substituent is selected from the group consisting of $R^2$, $HOR^3$, and

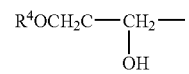

wherein $R^2$ is an alkyl group containing from about 8 to about 28 carbon atoms, $R^3$ is an alkylene group containing from about 8 to about 28 carbon atoms and the OH group is on the carbon atom beta to the ether group, and $R^4$ is an alkyl group containing from about 5 to about 25 carbon atoms, wherein the substituent R or $HOR^1$ is present in a molecular substitution of from about 0.3 to about 1.5 and wherein the substituent $R^2$, $HOR^3$, or

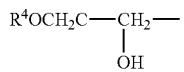

is present in a molecular substitution of from about 0.001 to about 0.2.

18. The method of claim 15 wherein said gelling agent polymer is a biopolymer selected from the group consisting of xanthan and succinoglycan.

19. The method of claim 15 wherein said gelling agent polymer is a water dispersible organic polymer selected from the group consisting of polyvinyl alcohol, polyacrylamide, polyacrylate, and polyacrilamide/acrylic acid copolymers.

20. The method of claim 15 wherein said gelling agent polymer is a polysaccharide selected from the group consisting of galactomannan gums, derivative galactomannan gums, and cellulose derivatives.

21. The method of claim 20 wherein said galactomannan gum is selected from the group consisting of guar gum, gum arabic, gum ghatti, gum karaya, tamarind gum, and locust bean gum.

22. The method of claim 20 wherein said derivatized galactomannan gum is selected from the group consisting of carboxyalkyl and hydroxyalkyl derivatives of guar.

23. The method of claim 20 wherein said cellulose derivative is selected from the group consisting of carboxymethylcellulose, carboxymethylhydroxyethylcellulose, hydroxyethylcellulose, methylhydroxypropylcellulose, methylcellulose, ethylcellulose, propylcellulose, ethylcarboxymethylcellulose, methylethylcellulose, and hydroxypropylmethylcellulose.

24. The method of claim 15 wherein said hydrophobically modified gelling agent polymer is present in said fracturing fluid composition in an amount in the range of from about 20 lbs to about 60 lbs per 1000 gal of said composition.

25. The method of claim 15 wherein said ionic surfactant is an anionic surfactant selected from the group consisting of alpha olefin sulfonate, alkylether sulfates, alkyl phosphonates, alkane sulfonates, fatty acid salts, arylsulfonic acid salts, and mixtures thereof.

26. The method of claim 15 wherein said ionic surfactant is a cationic surfactant selected from the group consisting of trimethylcocoammonium chloride, trimethyltallowammonium chloride, dimethyldicocoammonium chloride, bis(2-hydroxyethyl)tallow amine, bis(2-hydroxyethyl)erucylamine, bis(2-hydroxyethyl)coco-amine, cetylpyridinium chloride, and mixtures thereof.

27. The method of claim 15 wherein said crosslinking agent is selected from the group consisting of boron compounds, compounds that supply zirconium IV ions, compounds that supply titanium IV ions, aluminum compounds, and compounds that supply antimony ions.

28. The method of claim 15 wherein said crosslinking agent is present in said aqueous treating fluid composition in an amount in the range of from about 2 lbs to about 40 lbs per 1000 gallons of said aqueous treating fluid composition.

29. An aqueous treating fluid composition for treating a subterranean formation comprising:
water;
a water soluble hydrophobically modified gelling agent polymer produced by grafting a low concentration of hydrophobic monomers onto a gelling agent polymer;
a crosslinking agent; and
an ionic surfactant having a hydrophobic chain portion associated with said hydrophobic monomers grafted onto said gelling agent polymer resulting in hydrophobically modified gelling agent polymer molecules having increased radiuses of gyration; wherein:
said ionic surfactant is present in said treating fluid composition in an amount in the range of from about 0.01% to about 0.025% by weight of said composition;
said hydrophobic monomers grafted onto said hydrophobically modified gelling agent polymer comprise at least two different alkyl substituents;
the first alkyl substituent is selected from the group consisting of R and $HOR^1$ wherein R is an alkyl group containing from 1 to about 4 carbon atoms and $R^1$ is an alkylene group containing from about 2 to about 4 carbon atoms and the OH group is on the carbon atom beta to the ether group;
the second alkyl substituent is selected from the group consisting of $R^2$, $HOR^3$, and

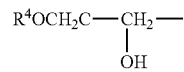

wherein $R^2$ is an alkyl group containing from about 8 to about 28 carbon atoms, $R^3$ is an alkylene group containing from about 8 to about 28 carbon atoms and the OH group is on the carbon atom beta to the ether group, and $R^4$ is an alkyl group containing from about 5 to about 25 carbon atoms;
the substituent R or $HOR^1$ is present in a molecular substitution of about 0.3 to about 1.5; and
the substituent $R^2$, $HOR^3$, or

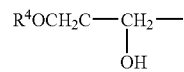

is present in a molecular substitution of from about 0.001 to about 0.2.

30. The composition of claim 29 wherein said water is selected from the group consisting of fresh water and salt water.

31. The composition of claim 29 wherein said gelling agent polymer is a biopolymer selected from the group consisting of xanthan and succinoglycan.

32. The composition of claim 29 wherein said gelling agent polymer is a water dispersible organic polymer selected from the group consisting of polyvinyl alcohol, polyacrylamide, polyacrylate, and polyacrilamide/acrylic acid copolymers.

33. The composition of claim 29 wherein said gelling agent polymer is a polysaccharide selected from the group consisting of galactomannan gums, derivative galactomannan gums, and cellulose derivatives.

34. The composition of claim 33 wherein said galactomannan gum is selected from the group consisting of guar gum, gum arabic, gum ghatti, gum karaya, tamarind gum, and locust bean gum.

35. The composition of claim 33 wherein said derivatized galactomannan gum is selected from the group consisting of carboxyalkyl and hydroxyalkyl derivatives of guar.

36. The composition of claim 33 wherein said cellulose derivative is selected from the group consisting of carboxymethylcellulose, carboxymethylhydroxyethylcellulose, hydroxyethylcellulose, methylhydroxypropylcellulose, methylcellulose, ethylcellulose, propylcellulose, ethylcarboxymethylcellulose, methylethylcellulose, and hydroxypropylmethylcellulose.

37. The composition of claim 29 wherein said hydrophobically modified gelling agent polymer is present in said composition in an amount in the range of from about 20 lbs to about 60 lbs per 1000 gal of said composition.

38. The composition of claim 29 wherein said ionic surfactant is an anionic surfactant selected from the group consisting of sodium lauryl sulfate, alpha olefin sulfonate, alkylether sulfates, alkyl phosphonates, alkane sulfonates, fatty acid salts, arylsulfonic acid salts, and mixtures thereof.

39. The composition of claim 29 wherein said ionic surfactant is a cationic surfactant selected from the group consisting of trimethylcocoammonium chloride, trimethyltallowammonium chloride, dimethyldicocoammonium chloride, bis(2-hydroxyethyl)tallow amine, bis(2-hydroxyethyl)erucylamine, bis(2-hydroxyethyl)coco-amine, cetylpyridinium chloride, and mixtures thereof.

40. The composition of claim 29 wherein said crosslinking agent is selected from the group consisting of boron compounds, compounds that supply zirconium IV ions, compounds that supply titanium IV ions, aluminum compounds, and compounds that supply antimony ions.

41. The composition of claim 29 wherein said crosslinking agent is present in said aqueous treating fluid composition in an amount in the range of from about 2 lbs to about 40 lbs per 1000 gallons of said aqueous treating fluid composition.

* * * * *